United States Patent [19]

Burton

[11] Patent Number: 4,584,099

[45] Date of Patent: Apr. 22, 1986

[54] SEWAGE SLUDGE FILTERING SYSTEM

[76] Inventor: R. Edward Burton, 23881 Sherwood Rd., Willits, Calif. 95490

[21] Appl. No.: 688,340

[22] Filed: Jan. 2, 1985

[51] Int. Cl.⁴ .................... B01D 35/08; B01D 35/18
[52] U.S. Cl. .................................. 210/203; 210/341; 210/470; 210/485; 210/497.01; 209/260
[58] Field of Search ...................... 210/323.1, 340, 341, 210/203, 470, 474, 485, 499, 497.01, DIG. 8; 209/260, 281

[56] References Cited

U.S. PATENT DOCUMENTS

| | | | |
|---|---|---|---|
| 1,065,335 | 6/1913 | Barton et al. | 210/499 |
| 1,224,213 | 5/1917 | Rosenthal | 210/497.01 |
| 1,500,712 | 7/1924 | McCarthy | 209/260 |
| 3,547,816 | 12/1970 | Horiguchi et al. | 210/203 |
| 3,835,999 | 9/1974 | Moore | 209/260 |
| 4,097,382 | 6/1978 | Cruea | 209/281 |
| 4,113,626 | 9/1978 | Detcher | 209/281 |
| 4,302,331 | 11/1981 | Condit, Jr. | 210/497.01 |

FOREIGN PATENT DOCUMENTS 2919914 11/1980 Fed. Rep. of Germany ...... 209/260

Primary Examiner—Benoit Castel
Attorney, Agent, or Firm—Flehr, Hohbach, Test, Albritton & Herbert

[57] ABSTRACT

A sewage sludge filtering system adapted for use with a polymer mixer for mixing a liquid polymer with sludge to produce an output mixture comprising coagulated sludge particles and water which comprises an elongated mesh hammock, a support arrangement for supporting the hammock in a generally horizontal orientation, and a piping system for communicating the output mixture to the interior of the hammock whereby the coagulated sludge particles are retained in the hammock and gradually dried as water escapes through the mesh of the hammock. An elongated filtrate tray is disposed under the mesh hammock for collecting filtrate and returning it to a sewage treatment facility.

9 Claims, 6 Drawing Figures

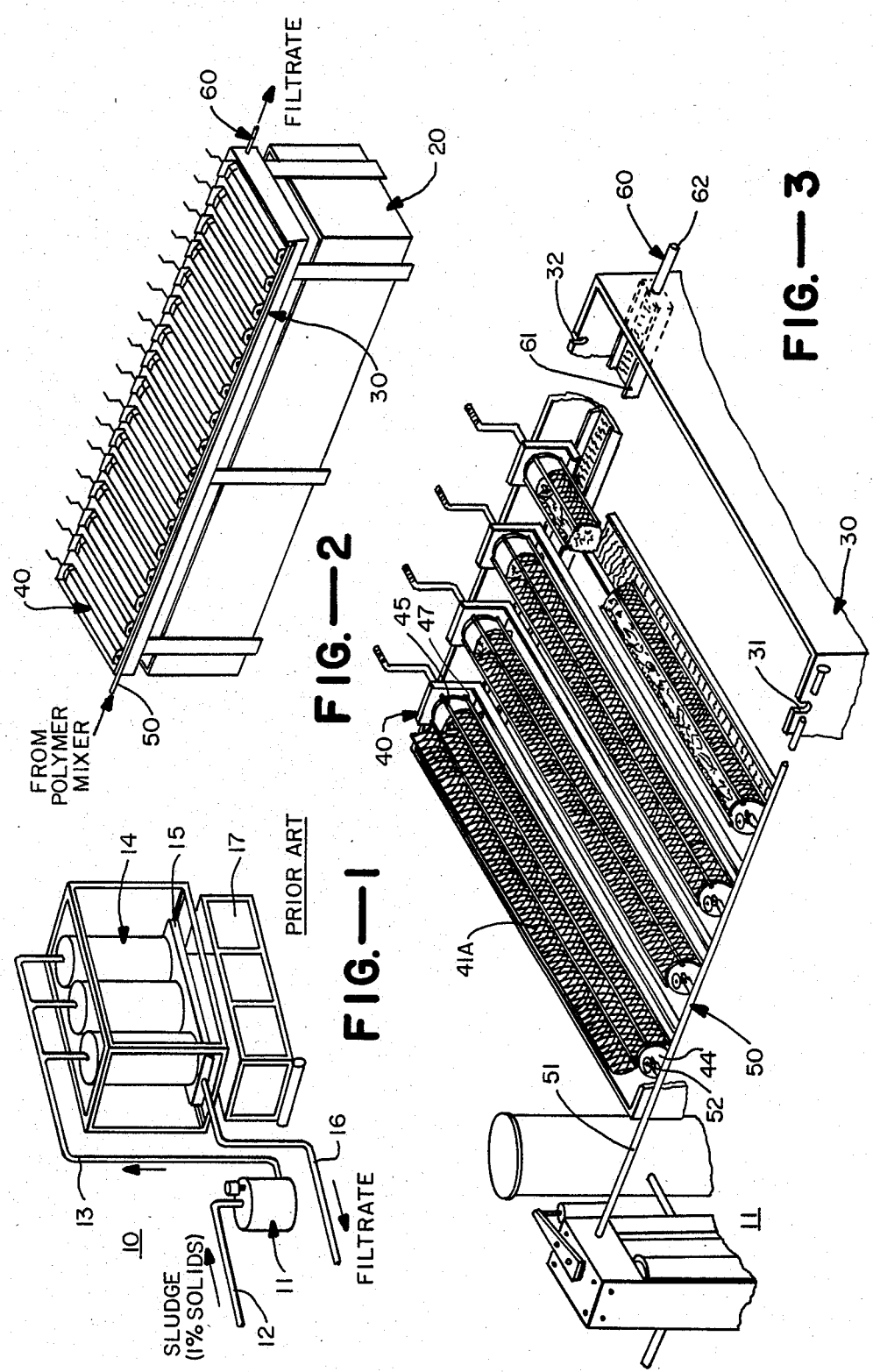

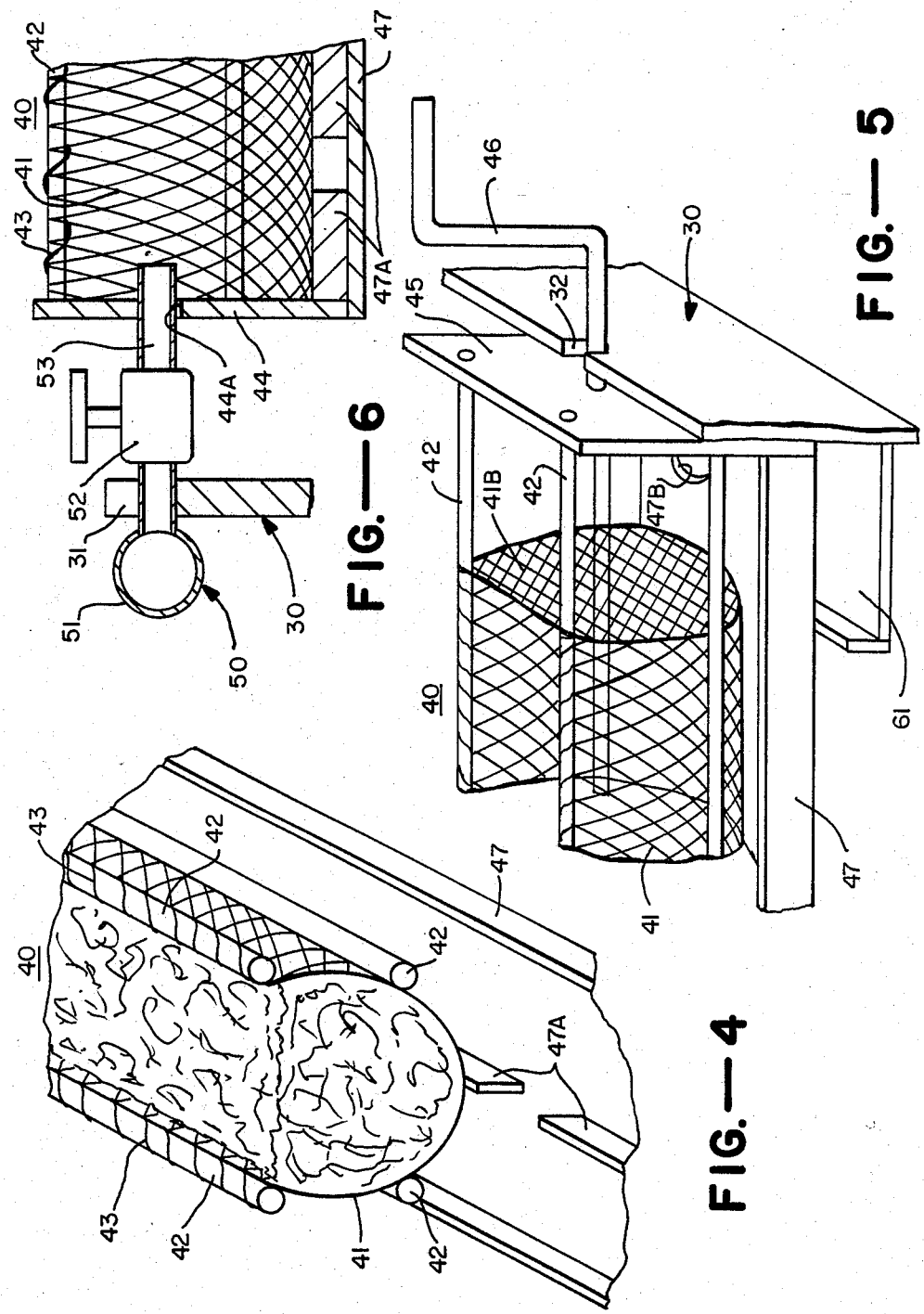

SEWAGE SLUDGE FILTERING SYSTEM

This invention relates generally to sewage treatment systems and, in particular, to sewage sludge filtering systems for removing water from the sludge and thereby increasing the percent solids content.

A number of different approaches which have been utilized in the prior art for filtering sludge to increase the percent solids content. Some of the traditional methods have utilized belt presses, filter presses, centrifuges, and sludge drying beds. The various sludge press and centrifuging systems are expensive to purchase, operate, and maintain. Sludge drying beds are utilized in most communities where sufficient land is available. However, although sludge drying beds are an inexpensive approach where sufficient land is available, there are a number of disadvantages involved in their use. For example, the dried sludge must be regularly scooped out of the drying bed and it is difficult to utilize mechanical equipment for this process without disturbing the sand foundation of the drying bed.

While in hot, dry weather, a twenty percent solids content can be achieved, in rainy weather, the sludge may not achieve a solids content any greater than about three percent. Because of the typical one foot thickness of the sludge in a sludge drying bed, the sludge usually develops a bad odor and draws flies.

More recently, a new sludge filtering system has been introduced by AFL Industries of Riviera Beach, Fla. This prior art AFL system is depicted in FIG. 1 of the drawings. As shown in FIG. 1, the overall sludge filtering system 10 utilizes a polymer mixer 11 which receives the sludge at about a one percent solids content through an input line 12 from the sewage treatment facility. When mixed with the polymer in the mixer 11, the polymer causes the sludge particles to coagulate and change fromn a pea soup type of consistency to a cottage cheese type of consistency. This mixture of coagulated sludge particles in water is pumped through a pipe 13 into an arrangement of sludge bag filters 14. Each of the individual sludge bag filters comprises a fine mesh bag about one meter in diameter and about one meter high. A plastic mesh size of about one-sixteenth inch is utilized to preclude the fragile coagulated sludge particles from flowing through the mesh due to the weight of the sludge in the bag.

Water from the sludge/water mixture passes through the mesh of the bag into a filtrate tray 15 and is returned by way of a pipe 16 to the sewage treatment facility. Each of the individual sludge bag filters 14 is gradually filled with the coagulated sludge particles. After filling, the sludge particles are typically left in the bags to dry for about twenty four hours. Thereafter, the water collecting tray 15 is moved out of the way and a draw string at the bottom of each sludge bag filter is opened to allow the sludge particles to drop into the drop box 17. Instead of the drop box 17, some other type of sludge collection system such as a conveyor could also be used.

While the sludge bag filter approach is an improvement over other prior art systems, it also has several disadvantages. The fine one-sixteenth inch mesh of the filter bag slows the draining rate of the water from the sludge particles. In addition, the large diameter of the sludge bag does not permit good air circulation into the sludge particles which are at the center of the bag. In addition, the requirement to shift the water collection tray away from the bottom of the sludge bag filters and manually open and close the bottom draw string arrangement of the bags involves messy manual labor which is undesirable. Accordingly, it is seen that there is still substantial room for improvement in apparatus utilized for sludge filtering.

It is the principal object of this invention to provide an improved sludge filtering system.

It is a further object of this invention to provide a sludge filter system which combines effective sludge filtering with operator convenience and avoidance of mess.

One aspect of this invention features a sewage sludge filtering system which is adapted for use with a polymer mixer which mixes a liquid polymer with sludge to produce an output mixture comprising coagulated sludge particles and water. The system of this invention employs an elongated mesh hammock together with support means for supporting the hammock in a generally horizontal orientation. An arrangement is provided for communicating the output mixture of coagulated sludge particles and water to the interior of the hammock so that the coagulated sludge particles are gradually dried as the water escapes through the mesh of the hammock itself.

In a preferred embodiment, an elongated tray is disposed under the hammock for collecting the filtrate and returning it to a sewage treatment facility. It is also preferable to construct the mesh hammock to have either an open top or a removable top cover and to provide a support arrangement for the hammock which includes an arrangement for rotatably mounting the hammock about a longitudinal axis such that the hammock can be inverted to dump the sludge particles out of the top portion therein into a collecting arrangement.

In a preferred embodiment of the invention the elongated filtrate collecting tray is mounted to the support arrangement for the mesh hammock so that the tray rotates with the hammock and thus automatically moves out of the path of the sludge particles which are dumped through the top of the hammock as it is inverted. The rotational mounting of the hammock can be accomplished by utilizing a crank arrangement attached to an end plate on one end of the support arrangement and utilizing the stub end of a delivery pipe extending through an aperture in a second end plate. With the axis of the crank and the stub pipe end defining an axis of rotation, it becomes a simple matter to rotate the crank arm and invert the mesh hammock to dump sludge particles into a sludge collection system disposed underneath the hammock.

In a typical overall system, a number of sludge filter modules of the type described above would be mounted in a side-by-side relationship on a generally rectangular frame disposed over a sludge collection arrangement. A piping system would communicate the output mixture of coagulated sludge and water into each of the hammock type sludge filter modules with an individual control valve associated with each of the modules.

Utilizing the horizontally disposed, elongated mesh hammock arrangement of this invention, a larger mesh size, for example, a one-quarter inch mesh can be utilized to promote more rapid draining of the water from the coagulated sludge particles. The preferred diameter of the individual mesh hammocks is about eight or nine inches and this promotes good air circulation through the coagulated sludge particles retained within the hammock. This helps to keep the sludge aerobic and reduces odor problems.

With the overall arrangement of this invention, sludge filtering can be accomplished to concentrate the sludge from one percent solid to four to nine percent solid in a twenty four hour filtering period. The person operating this system is at no time required to come in contact with the sludge particles. The only tending required by the system is the initial filling operation of the array of mesh hammocks after start-up of the polymer mixer to keep the individual hammocks filling until they are totally full of the coagulated sludge particles. This consumes about forty five minutes to an hour of time.

This hammock sludge filtering system of this invention is a very low cost system which permits large numbers of units to be employed and thus encourages this form of sewage treatment.

Other objects, features, and advantages of this invention will be apparent from a consideration of the detailed description given below in conjunction with the accompany drawings.

FIG. 1 is a schematic view of a sludge bag filter system in accordance with the prior art.

FIG. 2 is an isometric view depicting a hammock type of sludge filtering system in accordance with this invention.

FIG. 3 is an isometric view of a hammock type sludge filtering system in accordance with this invention showing individual details of the hammock type sludge filter modules incorporated into the system.

FIG. 4 is an enlarged fragmented view showing structural details of a preferred embodiment of a mesh hammock sludge filter module in accordance with this invention.

FIG. 5 is a partial cut-away view showing structural details of a mesh hammock filter module in accordance with this invention.

FIG. 6 is a partial section view showing structural details of a mesh hammock sludge filter module in accordance with this invention.

The prior art sludge bag filter system of FIG. 1 has been described above and that description need not be repeated here.

FIG. 2 depicts the main components of a mesh hammock type of sludge filtering system in accordance with this invention. These main components include a sludge collection arrangement 20, a mounting frame arrangement 30, a plurality of individual sludge filter modules 40 mounted on the frame arrangement in a side-by-side relation, a piping system 50 for communicating the output mixture of coagulated sludge particles and water from the polymer mixer to the individual sludge filter modules 40, and a filtrate collection system 60 for collecting the liquid filtrate from the individual sludge modules to return it to the sewage treatment system.

Referring to FIGS. 3-6, the structural details of a presently preferred embodiment of the individual mesh hammock filter modules will now be described. Each of the filter modules 40 includes a mesh hammock 41 and a support arrangement comprising end plate 44 and another end plate 45 with a plurality of support rods 42 mounted therebetween. The individual edges of the mesh hammock 41 are attached to the top pair of the support rods 42 utilizing a convenient fastening arrangement such as a lacing arrangement using plastic lace 43. One end 41B of the mesh hammock 41 is closed with a piece of mesh. The other end adjacent the end plate 44 may be closed with a similar piece of mesh. These two mesh end walls can be attached to the mesh hammock utilizing a lacing arrangement (not shown) or other convenient fastening arrangement.

A filtrate tray 47 is mounted between the end plates 44 and 45 underneath mesh hammock 41. Preferably, as shown in FIGS. 4 and 6, a spacer arrangement 47A is mounted in a central region of the bottom of the filtrate tray 47 to ensure that the bottom of a filled mesh hammock 41 does not contact the surface of the filtrate tray. At one end of the filtrate tray 47, a hole 47B is provided to communicate with the filtrate collection tray 61 which collects filtrate from each of the individual mesh hammock filter modules to deliver to an outlet pipe 62.

As shown in FIG. 5, the mesh hammock 41 is terminated by end wall portion 41B spaced a distance from the end plate 45 so that dried sludge particles will not be dumped into the filtrate collection tray 61 when the hammock filter module is inverted using the hand crank arrangement 46. As shown in FIG. 5, hand crank 46 is mounted to the end plate 45 and rests in slot 32 in the mounting frame 30. A shown in FIG. 6, end plate 44 has an aperture 44A therein which receives a pipe stub end 53 in a loose fitting arrangement so that end plate 44 and the entire hammock filter module will rotate on the pipe stub 53.

The individual control valves 52 regulate the flow of coagulated sludge particles and water into the individual hammock filter modules 40. As shown in FIG. 3, each of the individual filter modules has a separate flow control valve 52 associated therewith. Each flow control valve 52 may, for example, be mounted in a slot 31 in the mounting frame 30.

The overall hammock type sludge filter system depicted in FIGS. 2-6 is operated in the following manner. The polymer mixer 11 is turned on and adjusted to produce the right mixture of polymer and sludge to coagulate the sludge particles in the output line 51. Thereafter, each of the individual flow control valves 52 is operated to communicate this coagulated mixture of sludge particles and water into the individual mesh hammocks of the hammock filter modules. The flow of the mixture into the individual modules is regulated so that each of the mesh hammocks in the modules are gradually filled with coagulated sludge particles while the water passes through the mesh of the hammock into the filtrate tray 47 and into the filtrate collection tray 61 to be delivered back to the sewage treatment plant.

After each of the mesh hammocks is filled with coagulated sludge particles, the flow control valves 52 are shut off and the polymer mixer 11 is shut down. The hammock filter modules are then left sitting in the open air for further drying of the coagulated sludge particles and further draining of the water therefrom, typically for at least about a twenty-four hour period. After this time, the individual hammock filters are rotated using the crank arrangement 46 to dump the sludge particles into the collection box 20 or other sludge collection arrangement. Thereafter, the process of filling the mesh hammock filters is repeated. After the sludge box 20 is filled with sludge, it can be taken to a disposal site.

As shown in FIGS. 4 and 5, the top region of the mesh hammock 41 may be completely open between the top pair of support rods 42. Alternatively, as shown in the leftmost module in FIG. 3, a mesh cover 41A may be employed to cover the top of each of the mesh hammock modules. The cover 41A may comprise the same plastic mesh stretched between two support rods and mounted in a hinge fashion to one of the other support rods at the top of the module. Other approaches to providing a removable cover for the individual filter modules could also be implemented.

The mesh of the hammock itself is preferably a plastic mesh having an one quarter inch mesh spacing for overall corrosion resistance and rapid draining of water from the mixture entering the hammock. The other components of the mesh filter module may be formed out of steel material coated with a corrosion resistant material such as epoxy paint. A polyester twine may be utilized for lacing the individual edges of the mesh hammock to the support rods.

The dimensions of the individual mesh hammocks are not critical. It is convenient, for example, to utilize a hammock which is about eight feet long and has a diameter of about nine inches. Preferably, the width of the filtrate pan 47 is then about ten inches. Utilizing mesh hammock filter modules of this size and employing 150 individual module units, about 700,000 gallons of raw sludge per day can be handled by the filter system. It will be appreciated that any number of individual modules can be employed to handle whatever volume of sewage sludge is required by the treatment facility.

From the detailed description given above, it should be apparent that the system of this invention provides an efficient and relatively trouble-free and mess-free approach to filtering sewage sludge. The filtering system consumes no electric power other than that which is required to drive the polymer mixer. The system of this invention can be operated out in the open during dry weather or can readily be covered with a simple roofing system. Good air circulation through the individual filter modules promotes increase in the solid content from about one percent to about four to nine percent in about a twenty four hour drying period. Further increases in solid content can be achieved by leaving the coagulated sludge particles in the system for a longer period, but the rate of further moisture escape is relatively slow. Further drying of the sludge particles can be achieved by blowing heated air over the system if desired.

The above description a preferred embodiment of the sludge filtering system of this invention is given by way of example only and it should be apparent that numerous changes could be made without departing from the basic principles of the invention. For example, there are numerous alternative ways that the individual mesh filter modules could be mounted to a support frame for rotation between normal and inverted positions. The individual filtrate trays 47 need not be attached to the same support structure as the mesh hammock itself. Instead, these trays could be mounted on a sliding shelf arrangement so that the individual trays could be moved out of the way of a hammock being dumped. If desired, automated or semi-automated systems could be provided for rotating the individual filter modules either individually or simultaneously. In addition, the whole process of loading the individual mesh filter modules with the sludge/water mixture could be done in automated or semi-automated fashion if desired. Instead of using a dump box 20 as the sludge collection system, a variety of other approaches could be utilized, including dumping the sludge particles onto a conveyor belt for transport to a disposal site. These and other modifications can be made by artisans in this field without departing from the scope of the invention as claimed in the following claims.

What is claimed is:

1. In a sewage sludge filtering system adapted for filtering a mixture comprising coagulated sludge particles and water exiting from a polymer mixer wherein a liquid polymer is mixed with sludge from a sewage treatment plant, in combination:

a sludge collection arrangement;
 a mounting frame disposed in a generally horizontal orientation over said sludge collection arrangement;
 a plurality of sludge filter modules mounted on said frame in a generally side-by-side relationship;
 a piping system adapted to be coupled to said polymer mixer for communicating said mixture to each of said sludge filter modules and including an individual flow control valve associated with each of said modules; and
 a filtrate collection system mounted to said frame for collecting liquid filtrate from said sludge filter modules and adapted to be connected to a return line to the sewage treatment plant;
 each of said sludge filter modules comprising an elongated mesh hammock arranged to receive a volume of said mixture and constructed and arranged to have one of an open top region or a removable top cover, support means for supporting said hammock on said frame and including means mounting said hammock for rotation about a longitudinal axis to enable said hammock' to be invertred for dumping dewatered sludge particles therefrom, and an elongated filtrate tray mounted to said support means underneath said mesh hammock for rotation with said hammock to be relocated out of the path of dumping sludge particles when said hammock is inverted, each of said elongated filtrate trays having a liquid flow connection to said filtrate collection system.

2. The system of claim 1, wherein said piping system is mounted on said mounting frame and includes a plurality of pipe stub ends extending a short distance into the interior of said frame for communicating said output mixture to said sludge filter modules; said support means for each of said sludge filter modules includes a pair of end plates, one of said end plates having a centrally disposed aperture therein for receiving an associated pipe stub end in a loose fitting manner to enable rotation of said end plate thereon, the other of said end plates having a crank arrangement mounted thereto and received in a groove on said mounting frame for rotation thereon; said filtrate tray being mounted to the bottom of said end plates.

3. The system of claim 1, wherein said support means comprises a pair of end plates, a plurality of spaced support rods mounted between said end plates with a top pair thereof having one edge of said mesh hammock fastened thereto, and a filtrate tray mounted between said end plates underneath said support rods and said mesh hammock for collecting filtrate leaving said hammock.

4. The system of claim 3, wherein said filter tray includes spacer means formed on a top inner surface of said tray and adapted to contact the bottom of said mesh hammock to space said hammock away from said inner surface when said hammock is filled with coagulated sludge particles.

5. The system of claim 3, wherein said filtrate collection system includes a collection tray mounted to a side of said frame orthogonal to said hammocks and extending underneath one end of each of said filtrate trays; and each of said filtrate trays includes an aperture in the bottom wall thereof near said one end thereof for discharging liquid from said filtrate tray to said collection tray.

6. In a sewage sludge filtering system adapted for filtering a mixture of coagulated sludge particles and water exiting from a polymer mixer wherein liquid polymer is mixed with sludge from a sewage treatment plant: an elongated mesh hammock; an elongated filtrate tray; support means for supporting said hammock in a generally horizontal orientation and including means for mounting said hammock for rotation about a longitudinal axis and means mounting said filtrate tray underneath said hammock for rotation with said hammock; means for communicating a mixture of coagulated sludge particles and water to the interior of said hammock whereby said coagulated sludge particles are retained in said hammock and graudally dewatered as water in said mixture escapes through the mesh of said hammock into said filtrate tray; and means for communicating liquid out of said filtrate tray adapted to be connected to a return line to a sewage treatment plant; said support means enabling said hammock to be inverted to dump dewatered sludge particles retained therein from said hammock with said filtrate tray rotating out of the path of said sludge particles being dumped.

7. The system of claim 6, wherein said support means comprises a pair of end plates, a plurality of spaced support rods mounted between said end plates with a top pair thereof having one edge of said mesh hammock fastened thereto, and means mounting said end plates for rotation about said horizontal axis; said filtrate tray having a pair of ends mounted to said end plates for rotation therewith.

8. The system of claim 7, further comprising hand crank means mounted to one of said end plates at said horizontal axis of rotation for manually rotating said end plates and said hammock and filtrate tray mounted thereto.

9. The system of claim 6, further comprising a top cover and means mounting said cover over said hammock in a hinged manner such that said cover swings out of the path of dumping sludge particles as said hammock is inverted.

* * * * *